(12) United States Patent
Tominaga et al.

(10) Patent No.: US 10,710,470 B2
(45) Date of Patent: Jul. 14, 2020

(54) VEHICULAR COOLING SYSTEM

(71) Applicant: TOYOTA JIDOSHA KABUSHIKI KAISHA, Toyota-shi, Aichi-ken (JP)

(72) Inventors: Satoshi Tominaga, Susono (JP); Daisuke Tokozakura, Susono (JP); Yushi Seki, Susono (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 187 days.

(21) Appl. No.: 16/039,705

(22) Filed: Jul. 19, 2018

(65) Prior Publication Data

US 2019/0092186 A1    Mar. 28, 2019

(30) Foreign Application Priority Data

Sep. 25, 2017    (JP) .................. 2017-183136

(51) Int. Cl.
  *B60L 58/26*    (2019.01)
  *B60K 11/04*    (2006.01)
  *B60K 1/00*    (2006.01)
  *B60K 11/02*    (2006.01)

(52) U.S. Cl.
  CPC .............. *B60L 58/26* (2019.02); *B60K 1/00* (2013.01); *B60K 11/02* (2013.01); *B60K 11/04* (2013.01); *B60K 2001/005* (2013.01); *B60L 2240/36* (2013.01)

(58) Field of Classification Search
  CPC .......... B60K 1/00; B60K 11/02; B60K 11/04; B60K 2001/005; B60L 2240/36; B60L 58/26
  See application file for complete search history.

(56) References Cited

U.S. PATENT DOCUMENTS

| 2015/0217622 A1* | 8/2015 | Enomoto ........... B60H 1/00878 165/42 |
| 2016/0031288 A1* | 2/2016 | Nishikawa ................ F01P 3/20 165/202 |

(Continued)

FOREIGN PATENT DOCUMENTS

| JP | 2002-291106 A | 10/2002 |
| JP | 2010-284045 A | 12/2010 |
| JP | 2013-241858 A | 12/2013 |

(Continued)

*Primary Examiner* — Devon Russell
(74) *Attorney, Agent, or Firm* — Sughrue Mion, PLLC

(57) ABSTRACT

A coolant passage of a vehicular cooling system includes a battery coolant passage through which a coolant is supplied from a radiator to a battery, a discharge coolant passage through which the coolant is supplied to the radiator, a first bypass passage through which the coolant is supplied from the discharge coolant passage to the battery coolant passage while bypassing the radiator, and a switching valve that switches a pathway of the coolant, between a first pathway through which the coolant is supplied from the discharge coolant passage to the battery coolant passage via the radiator and a second pathway through which the coolant is supplied from the discharge coolant passage to the battery coolant passage via the first bypass passage. An electronic control unit controls the switching valve such that the pathway is switched to the second pathway at the time of increasing a temperature of the battery.

4 Claims, 2 Drawing Sheets

(56) References Cited

U.S. PATENT DOCUMENTS

2016/0102894 A1* 4/2016 Berg .................. H01M 10/625
  62/119
2017/0365901 A1* 12/2017 Hiramitsu ........... H01M 8/0432

FOREIGN PATENT DOCUMENTS

| JP | 2014-020280 A | 2/2014 |
| JP | 2014-073802 A | 4/2014 |
| JP | 2015-107728 A | 6/2015 |
| WO | 2017/017867 A1 | 2/2017 |

* cited by examiner

VEHICULAR COOLING SYSTEM

INCORPORATION BY REFERENCE

The disclosure of Japanese Patent Application No. 2017-183136 filed on Sep. 25, 2017 including the specification, drawings and abstract is incorporated herein by reference in its entirety.

BACKGROUND

1. Technical Field

The present disclosure relates to a vehicular cooling system.

2. Description of Related Art

Japanese Unexamined Patent Application Publication No. 2014-073802 (JP 2014-073802 A) describes a hybrid vehicle (HV) including a battery cooling circuit and a unit cooling circuit. The battery cooling circuit is configured to air-cool a battery. In the unit cooling circuit, a coolant stored in a reservoir tank is subjected to heat exchange with the air for cooling the battery, the coolant is then supplied to a radiator and cooled by the radiator, and then the coolant that has been subjected to heat exchange performed by an oil cooler is returned to the reservoir tank. Japanese Unexamined Patent Application Publication No. 2002-291106 (JP 2002-291106 A) describes a technique in which, when the temperature of a battery is low, the electric power that cannot be received by the battery is consumed by an external resistor and the external resistor is used as a heater to increase the temperature of the battery.

SUMMARY

When the configuration of the unit cooling circuit described in JP 2014-073802 A is employed, the coolant that has been cooled by the radiator is subjected to heat exchange with the battery after cooling the oil cooler. This makes the effect of cooling the battery insufficient. Thus, it is necessary to additionally provide a battery cooling circuit configured to cool the battery by using the outside air. Therefore, the number of components is increased, resulting in increases in cost and weight of a vehicle. As described in JP 2002-291106 A, when the temperature of the battery is low, it is necessary to increase the temperature of the battery in order to enhance the power efficiency. However, when the charged power is used to increase the temperature of the battery, the amount of charge is decreased.

The present disclosure provides a vehicular cooling system configured to cool a battery and increase the temperature of the battery without significantly increasing the number of components.

An aspect of the present disclosure relates to a vehicular cooling system including a battery, a transmission oil cooler, a radiator, a power control unit, a coolant passage, and an electronic control unit. The battery is configured to perform heat exchange with a coolant. The transmission oil cooler is configured to perform heat exchange between the coolant and transmission oil. The radiator is configured to cool the coolant. The power control unit is configured to perform heat exchange with the coolant. The power control unit is configured to convert direct-current electric power output from the battery into alternating-current electric power. Through the coolant passage, the coolant is supplied to the radiator, the battery, the power control unit, and the transmission oil cooler. The coolant passage includes a battery coolant passage, a discharge coolant passage, a first bypass passage, and a switching valve. The battery coolant passage is a passage through which the coolant is supplied from the radiator to the battery. The discharge coolant passage is a passage through which the coolant is supplied to the radiator. The first bypass passage is connected to the battery coolant passage and the discharge coolant passage. The first bypass passage is a passage through which the coolant is supplied from the discharge coolant passage to the battery coolant passage while bypassing the radiator. The switching valve is configured to switch a pathway of the coolant, between a first pathway through which the coolant is supplied from the discharge coolant passage to the battery coolant passage via the radiator and a second pathway through which the coolant is supplied from the discharge coolant passage to the battery coolant passage via the first bypass passage. The electronic control unit is configured to control the switching valve such that the switching valve switches the pathway of the coolant to the second pathway at a time of increasing a temperature of the battery.

In the vehicular cooling system according to the above aspect, the coolant passage may include a second bypass passage connected to the battery coolant passage, the second bypass passage may be a passage through which the coolant is supplied from the battery coolant passage to the power control unit, the coolant passage may include a flow-regulating valve configured to control a flow rate of the coolant to be supplied toward the battery coolant passage and a flow rate of the coolant to be supplied toward the second bypass passage, and the electronic control unit may be configured to control the flow-regulating valve such that the flow-regulating valve regulates a flow rate of the coolant to be supplied to the battery and a flow rate of the coolant to be supplied to the power control unit.

In the vehicular cooling system according to the above aspect, the coolant passage may include a second bypass passage connected to the battery coolant passage, the second bypass passage may be a passage through which the coolant is supplied from the battery coolant passage to the transmission oil cooler, the coolant passage may include a flow-regulating valve configured to control a flow rate of the coolant to be supplied toward the battery coolant passage and a flow rate of the coolant to be supplied toward the second bypass passage, and the electronic control unit may be configured to control the flow-regulating valve such that the flow-regulating valve regulates a flow rate of the coolant to be supplied to the battery and a flow rate of the coolant to be supplied to the transmission oil cooler.

In the vehicular cooling system according to the above aspect, the coolant passage may include a passage through which the coolant that has been discharged from the battery is supplied to the power control unit and then to the transmission oil cooler.

With the foregoing configuration, the coolant that has been cooled to a low temperature by the radiator can be supplied to the battery and the power control unit in parallel. Thus, it is possible to enhance the performance of cooling each of the battery and the power control unit. With the foregoing configuration, the coolant that has been cooled to a low temperature by the radiator can be preferentially supplied toward the transmission oil cooler, when a higher priority is given to cooling of the transmission oil than to cooling of the battery and the power control unit, for example, when a vehicle is traveling at a high speed in a steady state.

In the vehicular cooling system according to the aspect of the present disclosure, the same coolant is used both to cool the battery and to perform heat exchange in the transmission oil cooler. Thus, it is possible to cool the battery without significantly increasing the number of components. Further, when the temperature of the battery is low, it is possible to increase the temperature of the battery by using heat of the coolant that has been discharged from the transmission oil cooler.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, the configurations of vehicular cooling systems according to first and second embodiments of the present disclosure will be described with reference to the accompanying drawings.

First Embodiment

First, the configuration of a vehicular cooling system according to a first embodiment of the present disclosure will be described with reference to FIG. 1.

Figure 1:
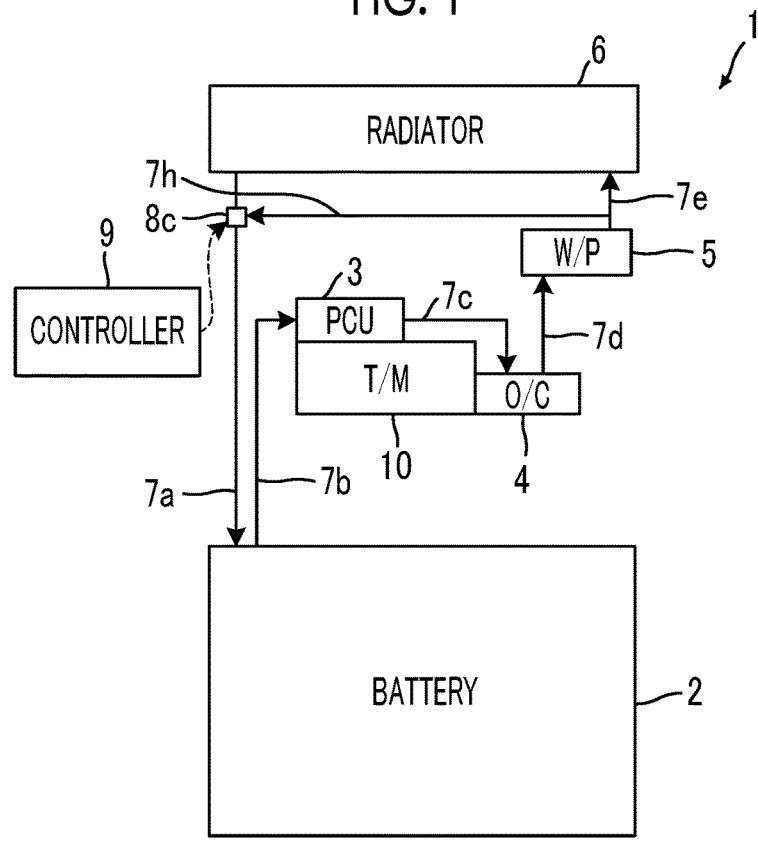
FIG. 1 is a schematic diagram illustrating the configuration of a vehicular cooling system according to a first embodiment of the present disclosure.

FIG. 1 is a schematic diagram illustrating the configuration of the vehicular cooling system according to the first embodiment of the present disclosure. A vehicular cooling system 1 according to the first embodiment of the present disclosure is mounted in a vehicle, such as an electric automobile, and the vehicular cooling system 1 includes a battery 2, a power control unit (hereinafter, referred to as "PCU") 3, a transmission oil cooler (hereinafter, referred to as "oil cooler", and abbreviated as "O/C" in the drawings) 4, a water pump (abbreviated as "W/P" in the drawings) 5, and a radiator 6 as main components, as illustrated in FIG. 1. The target cooling temperature for the battery 2, the target cooling temperature for the PCU 3, and the target cooling temperature for the oil cooler 4 ascend (i.e., rise) in this order. That is, the target cooling temperature for the battery 2, the target cooling temperature for the PCU 3, and the target cooling temperature for the oil cooler 4 satisfy Relational Expression (1) indicated below.

Target cooling temperature for battery 2 (e.g., about 35° C.)<target cooling temperature for PCU 3 (e.g., about 65° C.)<target cooling temperature for oil cooler 4 (e.g., about 100° C.) Relational Expression (1)

The battery 2 is a secondary battery from which electric power is supplied to the vehicle. The battery 2 is accommodated in a battery case (not illustrated). A coolant passage 7a and a coolant passage 7b are connected to the battery case (not illustrated). A coolant that has been cooled by the radiator 6 flows through the coolant passage 7a, and the coolant that has been subjected to heat exchange with the battery 2 is discharged to the coolant passage 7b. The battery 2 is cooled or warmed up as needed, by heat exchange with the coolant that has been supplied through the coolant passage 7a. The coolant passage 7a is an example of a battery coolant passage according to the present disclosure.

The PCU 3 is an apparatus configured to control the battery 2 and a motor mounted in the vehicle. The PCU 3 converts direct-current electric power output from the battery 2 into alternating-current electric power, and then supplies the alternating-current electric power to the motor. The PCU 3 includes devices, such as an inverter and a converter. The PCU 3 is accommodated in a PCU case (not illustrated). The coolant passage 7b and a coolant passage 7c are connected to the PCU case. The coolant that has been subjected to heat exchange with the PCU 3 is discharged to the coolant passage 7c. The PCU 3 is cooled by heat exchange with the coolant that has been subjected to heat exchange with the battery 2 and that has been supplied through the coolant passage 7b.

The oil cooler 4 is a heat exchanger configured to cool transmission oil used to lubricate and cool a transmission (abbreviated as "T/M" in the drawings) 10 of the vehicle. The coolant passage 7c and a coolant passage 7d are connected to the oil cooler 4. The coolant that has been subjected to heat exchange with the transmission oil is discharged to the coolant passage 7d. The oil cooler 4 cools the transmission oil by performing heat exchange between the transmission oil and the coolant that has been subjected to heat exchange with the PCU 3 and that has been supplied through the coolant passage 7c.

The water pump 5 is a pump configured to circulate the coolant among the components of the vehicular cooling system 1. The coolant passage 7d and a coolant passage 7e are connected to the water pump 5. The coolant that has been pumped (i.e., pressure-fed) from the water pump 5 flows through the coolant passage 7e. The water pump 5 pumps (i.e., pressure-feeds) the coolant, which has been subjected to heat exchange with the transmission oil, to the radiator 6 through the coolant passage 7e.

The radiator 6 is an air-cooling device configured to cool the coolant that has been pumped from the water pump 5. The coolant passage 7e and the coolant passage 7a are connected to the radiator 6. The radiator 6 cools the coolant that has been pumped from the water pump 5 through the coolant passage 7e, and then discharges the cooled coolant to the coolant passage 7a.

In the vehicular cooling system 1 configured as described above, the coolant that has been cooled by the radiator 6 is supplied to the battery 2, the PCU 3, and the oil cooler 4 in this order through the coolant passages 7a, 7b, 7c, 7d, 7e. As described above, the target cooling temperature for the battery 2, the target cooling temperature for the PCU 3, and the target cooling temperature for the oil cooler 4 ascend in this order. Therefore, it is possible to enhance the cooling performance of the vehicular cooling system 1 as a whole, by first supplying the coolant, which has been cooled to a low temperature by the radiator 6, to the battery 2 that needs to be cooled to the lowest temperature among the battery 2, the PCU 3, and the oil cooler 4, then supplying the coolant to the PCU 3, and then supplying the coolant to the oil cooler 4.

In the first embodiment, a coolant passage 7h is connected to the coolant passage 7e. Through the coolant passage 7h, the coolant that has been pumped from the water pump 5 is supplied to the coolant passage 7a while bypassing the radiator 6 (i.e., without flowing through the radiator 6). A switching valve 8c is provided at a connection point at which the coolant passage 7a and the coolant passage 7h are connected to each other. By controlling the switching valve 8c, the pathway of the coolant that has been pumped from the water pump 5 is switched between a pathway through which the coolant is supplied to the battery 2 via the radiator 6 and a pathway through which the coolant is supplied to the battery 2 via the coolant passage 7h while bypassing the radiator 6.

With the configuration described above, when the battery 2 needs to be warmed up, a controller 9, such as an electronic control unit (ECU), controls the switching valve 8c such that the coolant, which has been pumped from the water pump 5 via the coolant passage 7h while bypassing the radiator 6, is supplied to the battery 2. Thus, the battery 2 is warmed up, so that the output of the battery 2 can be improved.

As is apparent from the above description, the vehicular cooling system 1 according to the first embodiment of the present disclosure includes the battery 2 configured to perform heat exchange with the coolant, the oil cooler 4 configured to perform heat exchange between the coolant and the transmission oil, and the radiator 6 configured to cool the coolant. With the configuration described above, the same coolant is used both to cool the battery 2 and to perform heat exchange in the oil cooler 4. Thus, it is possible to cool the battery 2 without significantly increasing the number of components.

In the vehicular cooling system 1 according to the first embodiment of the present disclosure, when the temperature of the battery 2 is low, the controller 9, such as the ECU, controls the switching valve 8c such that the coolant, which has been pumped from the water pump 5 via the coolant passage 7h while bypassing the radiator 6, is supplied to the battery 2. Thus, it is possible to increase the temperature of the battery 2 by using heat of the coolant that has been discharged from the oil cooler 4.

Second Embodiment

The configuration of a vehicular cooling system according to a second embodiment of the present disclosure will be described with reference to FIG. 2, FIG. 3A, FIG. 3B, and FIG. 3C. Hereinafter, only the configurations different from those of the vehicular cooling system 1 in FIG. 1 will be described, and description of the same configurations as those of the vehicular cooling system 1 in FIG. 1 will be omitted.

Figure 2:
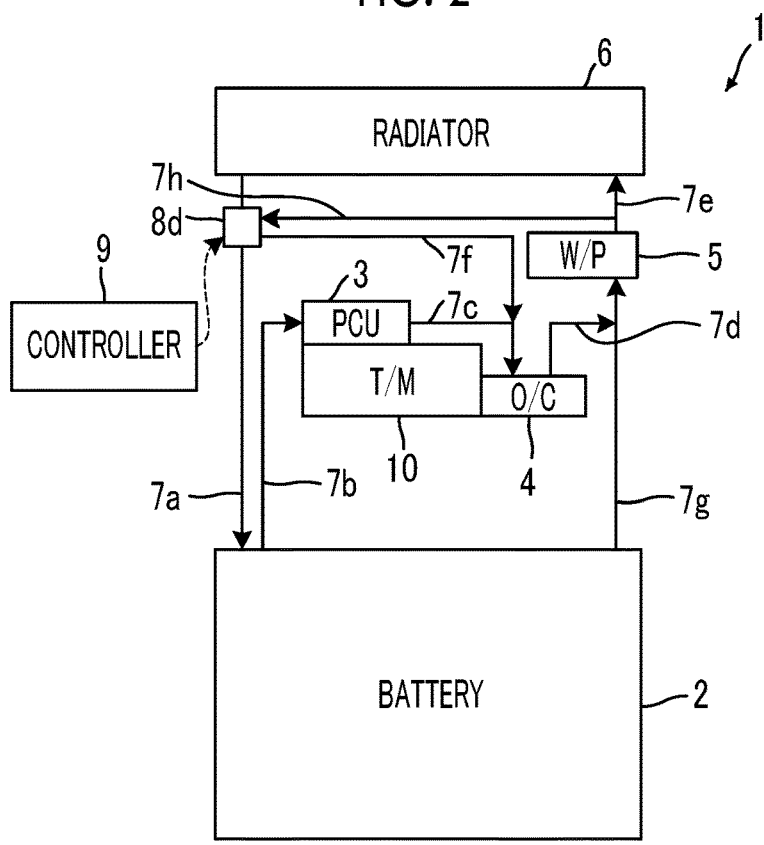
FIG. 2 is a schematic diagram illustrating the configuration of a vehicular cooling system according to a second embodiment of the present disclosure.

FIG. 2 is a schematic diagram illustrating the configuration of the vehicular cooling system according to the second embodiment of the present disclosure. As illustrated in FIG. 2, in the second embodiment, the battery 2 is provided with the coolant passage 7b and a coolant passage 7g. The coolant that has been subjected to heat exchange with the battery 2 is discharged to the water pump 5 through the coolant passage 7g. The outlet of the coolant passage 7d is connected to the coolant passage 7g. A flow-regulating and switching valve 8d is provided at a connection point at which the coolant passage 7a and the coolant passage 7h are connected to each other. A coolant passage 7f through which the coolant is supplied to the coolant passage 7c is connected to the flow-regulating and switching valve 8d. The flow-regulating and switching valve 8d has both the function as the switching valve 8c and the function of regulating the flow rate of the coolant to be supplied toward the battery 2 and the flow rate of the coolant to be supplied toward the coolant passage 7c.

With the configuration described above, the coolant that has been cooled to a low temperature by the radiator 6 can be preferentially supplied toward the oil cooler 4, when a higher priority is given to cooling of the transmission oil than to cooling of the battery 2 and the PCU 3, for example, when the vehicle is traveling at a high speed in a steady state. Because the flow-regulating and switching valve 8d has both the function of regulating the flow rate and the function as the switching valve 8c, functions of a plurality of cooling circuits can be achieved by using one valve. Thus, it is possible to decrease the number of components.

Figure 3A:
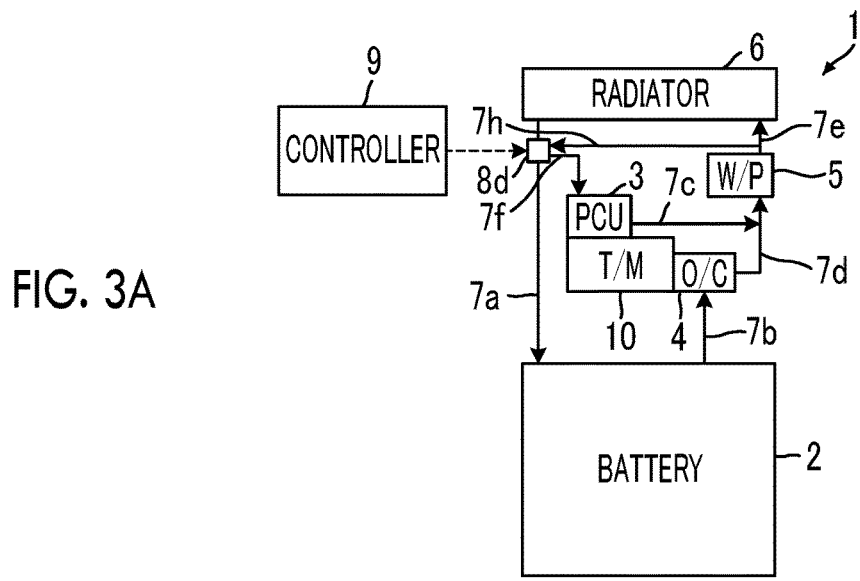
FIG. 3A is a schematic diagram illustrating the configuration of a vehicular cooling system according to a modified example of the second embodiment illustrated in FIG. 2.

In the vehicular cooling system 1 illustrated in FIG. 2, the coolant passage 7g may be omitted, the outlet of the coolant passage 7b may be connected to the oil cooler 4, the outlet of the coolant passage 7d may be connected to the water pump 5, and the outlet of the coolant passage 7c may be connected to the coolant passage 7d, as illustrated in FIG. 3A. With the configuration described above, the coolant that has been cooled to a low temperature by the radiator 6 can be supplied to the battery 2 and the PCU 3 in parallel. Thus, it is possible to enhance the performance of cooling each of the battery 2 and the PCU 3.

Figure 3B:
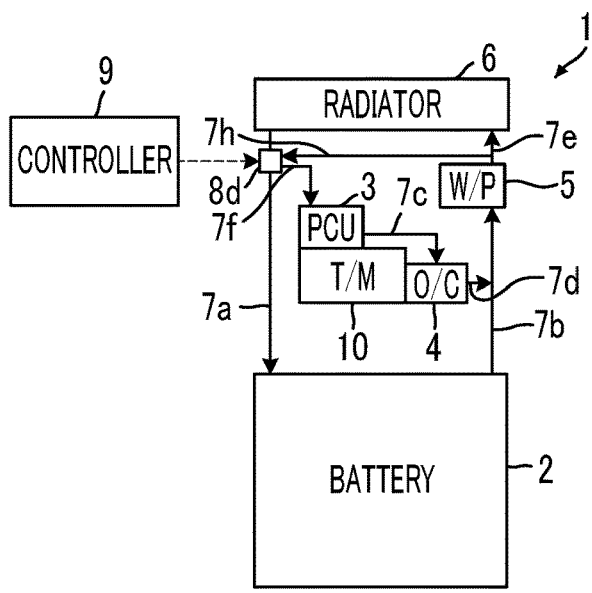
FIG. 3B is a schematic diagram illustrating the configuration of a vehicular cooling system according to another modified example of the second embodiment illustrated in FIG. 2.

In the vehicular cooling system 1 illustrated in FIG. 3A, the coolant passage 7g may be omitted, the outlet of the coolant passage 7b may be connected to the water pump 5, the outlet of the coolant passage 7d may be connected to the coolant passage 7b, and the outlet of the coolant passage 7c may be connected to the oil cooler 4, as illustrated in FIG. 3B.

Figure 3C:
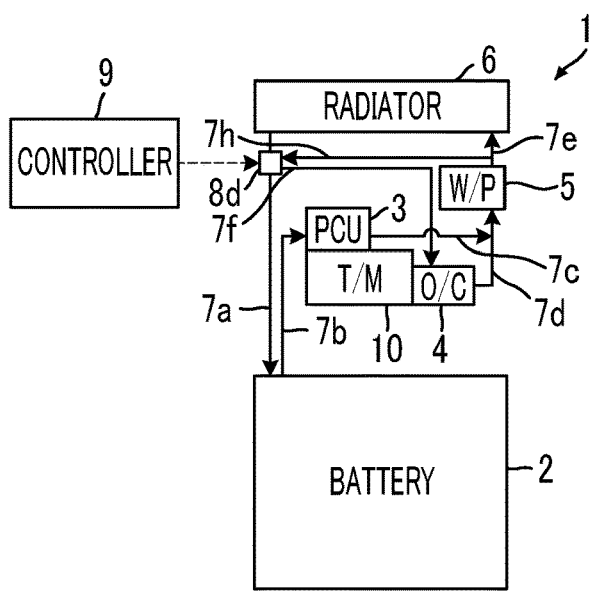
FIG. 3C is a schematic diagram illustrating the configuration of a vehicular cooling system according to yet another modified example of the second embodiment illustrated in FIG. 2.

In the vehicular cooling system 1 illustrated in FIG. 2, the coolant passage 7g may be omitted, the outlet of the coolant passage 7d may be connected to the water pump 5, the outlet of the coolant passage 7c may be connected to the coolant passage 7d, and the outlet of the coolant passage 7f may be connected to the oil cooler 4, as illustrated in FIG. 3C.

While the example embodiments of the present disclosure have been described, an applicable embodiment of the present disclosure is not limited to the foregoing embodiments. That is, all the other embodiments, examples, operation techniques, and so forth that can be achieved by a person skilled in the art based on the foregoing embodiments are within the scope of the present disclosure.

What is claimed is:

1. A vehicular cooling system comprising:
 a battery configured to perform heat exchange with a coolant;
 a transmission oil cooler configured to perform heat exchange between the coolant and transmission oil;
 a radiator configured to cool the coolant;
 a power control unit configured to perform heat exchange with the coolant, and the power control unit being configured to convert direct-current electric power output from the battery into alternating-current electric power;
 a coolant passage through which the coolant is supplied to the radiator, the battery, the power control unit, and the transmission oil cooler, the coolant passage including a battery coolant passage, a discharge coolant passage, a first bypass passage, and a switching valve, the battery coolant passage being a passage through which the coolant is supplied from the radiator to the battery, the discharge coolant passage being a passage through which the coolant is supplied to the radiator, the first bypass passage being connected to the battery coolant passage and the discharge coolant passage, the first bypass passage being a passage through which the coolant is supplied from the discharge coolant passage to the battery coolant passage while bypassing the radiator, and the switching valve being configured to switch a pathway of the coolant, between a first pathway through which the coolant is supplied from the discharge coolant passage to the battery coolant passage via the radiator and a second pathway through which the coolant is supplied from the discharge coolant passage to the battery coolant passage via the first bypass passage; and an electronic control unit configured to control the switching valve such that the switching valve switches the pathway of the coolant to the second pathway at a time of increasing a temperature of the battery.

2. The vehicular cooling system according to claim 1, wherein:

the coolant passage includes a second bypass passage connected to the battery coolant passage;

the second bypass passage is a passage through which the coolant is supplied from the battery coolant passage to the power control unit;

the coolant passage includes a flow-regulating valve configured to control a flow rate of the coolant to be supplied toward the battery coolant passage and a flow rate of the coolant to be supplied toward the second bypass passage; and the electronic control unit is configured to control the flow-regulating valve such that the flow-regulating valve regulates a flow rate of the coolant to be supplied to the battery and a flow rate of the coolant to be supplied to the power control unit.

3. The vehicular cooling system according to claim 1, wherein:

the coolant passage includes a second bypass passage connected to the battery coolant passage;

the second bypass passage is a passage through which the coolant is supplied from the battery coolant passage to the transmission oil cooler;

the coolant passage includes a flow-regulating valve configured to control a flow rate of the coolant to be supplied toward the battery coolant passage and a flow rate of the coolant to be supplied toward the second bypass passage; and the electronic control unit is configured to control the flow-regulating valve such that the flow-regulating valve regulates a flow rate of the coolant to be supplied to the battery and a flow rate of the coolant to be supplied to the transmission oil cooler.

4. The vehicular cooling system according to claim 1, wherein the coolant passage includes a passage through which the coolant that has been discharged from the battery is supplied to the power control unit and then to the transmission oil cooler.

* * * * *